Patented Sept. 9, 1941

2,255,302

UNITED STATES PATENT OFFICE 2,255,302

POLYMERIZATION OF OLEFINS

Henry J. Welge, Bryan, Tex.

No Drawing. Application August 30, 1938,
Serial No. 227,597

3 Claims. (Cl. 196—10)

This invention relates to the polymerization of mono-olefin hydrocarbons to produce higher homologues or polymers thereof. An especially important application of the invention is in the polymerization of olefins of relatively low boiling point, such as propylene, butylene or other mono-olefins which are gases at ordinary temperatures, to form polymerized hydrocarbons— particularly dimers of the original hydrocarbon— of higher boiling point, which are liquids at ordinary temperatures and whose boiling points lie within the boiling point range of motor fuels.

This application is a continuation-in-part of my application Serial No. 136,174, filed April 10, 1937.

Polymerization of such normally gaseous mono-olefins at moderate temperatures requires the use of some catalyst, and the present invention is concerned primarily with the use of an advantageous type of catalyst for this purpose.

It is well known that lower hydrocarbons belonging to the olefinic series react chemically with, and dissolve in, strong, concentrated acids such as sulphuric or phosphoric acids, to give an addition product of the acid and the hydrocarbon. When this addition product is heated to a suitable temperature which depends on the hydrocarbon used, a polymerization of two or more molecules of the hydrocarbon occurs.

Furthermore, an alternative way in which the desired polymerization may be effected consists in first heating separately the acid and the hydrocarbon, and then bringing them into contact with each other.

When either of these processes are used to achieve the polymerization of olefinic hydrocarbons, containers and equipment must be employed which will withstand the corrosive action of fairly concentrated acids. The operation of the processes also has other disadvantages inherent in the handling of corrosive and dangerous liquids.

Furthermore, liquid hydrocarbons formed by the reaction tend to dissolve in or emulsify with the liquid acid, causing difficulty in the complete separation and recovery of the hydrocarbon products or in the separation of the acid for reuse.

The principal object of the present invention is to provide a method of polymerizing mono-olefins, and particularly normally gaseous mono-olefins, which is free from the above-mentioned difficulties, and in which readily available catalysts of low cost may be employed.

Other objects of the invention will be pointed out hereinafter or will be apparent from the following description.

These objects are attained, in accordance with this invention, by the use of a catalytic agent which has a strongly acid reaction but which is solid at temperatures sufficient to cause the desired polymerization to take place.

If a polybasic acid be partially neutralized by, say, a strong base, an acid salt may be produced which is, in general, a solid, sometimes even at somewhat elevated temperatures, yet still has a more or less strongly acid reaction, depending on which polybasic acid be originally chosen. Now, among the polybasic acids which are of low enough cost to be considered for making catalysts for industrial polymerization processes, sulphuric acid is unusual in the respect that its acid salts have a strongly acid reaction. Consequently, the type of catalyst which I propose to use for polymerization comprises, in general, solid salts of sulphuric acid having a strongly acid reaction. As temperatures somewhat above atmospheric temperature are ordinarily desirable in order to cause the polymerization reaction to proceed at a sufficiently fast rate for commercial utilization of the process, I prefer to employ as catalysts salts of the above type which are solid at such temperatures.

Preferred examples of such catalysts are bisulphates of sodium, potassium and ammonium, which may be referred to generally as bisulphates of alkali metals. Other examples are other acid sulphates of alkali metals such as $Na_3H(SO_4)_2$ and acid sulphates of other metals, such as $Al_2(SO_4)_3 \cdot H_2SO_4 \cdot 3H_2O$ and $FeSO_4 \cdot H_2SO_4$.

The catalyst may be used in the form of lumps or particles of convenient size, consisting substantially wholly of the catalyst salt, and I prefer to use compounds which may be obtained in the form of crystals of sufficient size to permit free passage of the hydrocarbon fluid to be treated through a body of the catalyst.

A further advantage of the catalysts of the type above described is that they are completely soluble in water, so that in case the surfaces thereof become coated or contaminated by accumulation of gummy or carbonaceous impurities thereon, during use, to such an extent as to impair the catalytic action thereof, the catalyst material, which is ordinarily employed in the form of a pervious bed, layer, or column, may be washed with hot water or moist steam to dissolve and carry away the surface portions thereof together with the accumulated impurities, which enables the activity of the catalyst to be easily restored without removing it from the reaction chamber. It will be understood that the contact of the olefin with the catalyst would preferably be suspended or discontinued during such a water washing operation.

If desired, however, the catalyst may be mixed with or deposited upon relatively inert carrier materials, such as clay or pumice, as by crystallization or precipitation of the catalytic agent upon such carrier materials, or by impregnating the carrier with the melted catalyst.

In carrying out the invention, a mono-olefin, in gaseous state (either gas or vapor), is brought into contact with a solid catalyst of the type above described, at a temperature above atmospheric temperature and below the melting point of the catalyst, and is subjected to such contact for a sufficient length of time to cause polymerization. In commercial operation, the temperature should in most cases be about 100° C. or above, in order to provide a sufficiently rapid rate of reaction. The upper limit of temperature is, of course, fixed by the melting point of the solid catalyst, and may in some cases be influenced also by a desire to avoid the formation of higher polymers or other complex products whose formation is promoted by high temperatures. The temperature is subject, however, to considerable variation, depending upon the specific catalyst employed, the particular olefin or olefins treated, and the rate and completeness of reaction desired.

It will be understood that the pressure under which the polymerization reaction is carried out is such as to maintain the olefin undergoing treatment in the gaseous state at the reaction temperature employed.

The reaction will, in general, proceed at a more rapid rate, the higher the pressure to which the reacting olefins are subjected. Consequently, the reaction preferably is conducted at a pressure above normal atmospheric pressure.

The polymer or polymers produced may be allowed to condense in the reaction chamber and may be removed therefrom in liquid form, either continually or at intervals, or may be conducted away in vapor form and condensed or otherwise collected. It will be understood that the process may be applied either to a pure mono-olefin or to a mixture of mono-olefins (in which case one or more of the olefins may be caused to polymerize), or to a mixture of one or more mono-olefins with one or more other hydrocarbons or other fluids, such as by-product gases from petroleum cracking operations.

In general, I have found that water vapor in at least limited proportion must be present before polymerization will be catalyzed by acid sulphates such as described above. I have further discovered that chiefly those acid sulphates which are hygroscopic or which have an affinity for water are effective as catalysts for polymerization of olefins, and particularly those acid sulphates which retain their affinity for water at temperatures somewhat above normal atmospheric temperature, such as, for example, sodium bisulphate, $NaHSO_4$, which readily takes up water to form $NaHSO_4.H_2O$. In some cases, the admixture with acid sulphates, in the melted state, if desired, of other hygroscopic substances such as aluminum sulphate which, in themselves, may or may not have an acid reaction, may increase the effectiveness of the resulting catalyst material.

The invention thus contemplates carrying out the polymerization of mono-olefins by contact with the solid catalyst in the presence of a limited proportion of water vapor, either for the purpose of promoting the polymerizing reaction or for preventing deterioration or decomposition of the catalyst by loss of water. Such water vapor may be derived from water either physically or chemically associated with the solid catalyst, or may be introduced, preferably as steam, along with the olefin. In any cases where the presence of water tends to cause other reactions than the desired polymerization, such as hydrolysis (which tends to occur particularly with lower members of the olefinic series such as butylene), the proportion of water present should be so limited as to substantially minimize the occurrence of such other reactions, and should be relatively small as compared with the molecular proportion of olefin present. Furthermore, at any particular temperature of operation, the proportion of water present (either added as steam or derived from the catalyst material) should be kept sufficiently low to substantially avoid the presence of free water in liquid state and thus avoid formation of any considerable quantity of aqueous solution of the catalyst salt, with the possible exception of a thin film of aqueous solution on the surface of the particles of catalyst. It will be understood, therefore, that references herein to the presence of water vapor are intended to refer to water vapor which is either introduced in vapor form or derived from water associated with the solid catalyst, and that the molecular proportion of water present in vapor form should usually not be more than a small fraction of the molecular proportion of olefins which is caused to react.

Occasionally, in practicing my invention, it happens that the quantity of water present is sufficient to cause formation of a thin film of liquid on the surfaces of the catalyst, which may be due either to condensation of water and formation of an aqueous solution of the catalyst or to formation of a hydrated form of the catalyst which melts at the temperature employed, even though such temperature is below the melting point of the catalyst material originally employed. The liquid film thus formed may in some cases flow down to a lower point in the apparatus. While it will be understood that the conditions are preferably so chosen that such an occurrence is substantially avoided, it may be difficult to eliminate it completely when employing catalyst materials of a hygroscopic nature. Accordingly, it is to be understood that references herein and in the appended claims to use of a solid catalyst or to operation at temperatures below the melting point of the catalyst are not intended to exclude operation under conditions in which such liquid films are formed. In any event, the major portion of the catalyst material with which the olefin is treated will exist in solid form.

In some cases, it may be advantageous to subject an olefin or an olefin-containing gas to contact with the solid catalyst in a plurality of successive stages, to effect polymerization of a portion of the olefin content of such gas in each stage. For example, a gaseous mixture containing a plurality of different olefins which tend to polymerize most rapidly at different temperatures may be subjected to successive stages of contact with such a catalyst at progressively higher temperatures, in order to cause polymerization of one after another of such olefins, and the polymerized products formed in each of these stages are preferably separately collected, as by condensation, prior to the next succeeding stage. Treatment in successive stages, with condensation and separation of polymerized products between successive periods of contact with the catalyst, may also be advantageous in preventing or retarding the formation of higher polymers or other complex products, and in such cases the successive contact stages may be conducted at the same temperature or at different temperatures. In either of the above cases, a portion of the olefin content is polymerized in the first contact stage, and the gas or vapor is then subjected to one or more additional contact stages to cause polymerization of a further quantity of olefin present therein.

According to a preferred procedure, the catalyst may be packed in a tower or chamber, either with or without other packing material, and the pervious body of catalyst thus provided may be heated in any suitable manner, as by providing a steam jacket around the tower or chamber, and the olefin or olefins, either alone or together with other hydrocarbons, may be passed therethrough in gaseous state. An alternative arrangement consists in passing the olefin-containing gas or vapor over layers of the catalyst supported on shelves or plates in a heated chamber, or over layers of catalyst within heated horizontal tubes. It may be further desirable, in some cases, to heat the gas or vapor which is to be subjected to the polymerization process, in addition to, or instead of, heating the catalyst chamber. In supplying heat to maintain the reaction chamber at the desired temperature, it should be borne in mind that the above-described polymerization reactions are exothermic, and that the heat of reaction will furnish part of the necessary heat.

As another alternative method, the olefin or olefin-containing gaseous fluid may first be mixed or subjected to contact with the solid catalyst, for any desired period of time, at a relatively low temperature, for example, at or near atmospheric temperature, to cause formation of an addition product of the catalyst salt and the olefin or olefins, and the resulting mixture, or the addition product so formed after separation from unreacted olefin or other hydrocarbon materials present, may then be heated to a higher temperature, such as about 100° C. or above but below the melting point of the catalyst salt, to convert the addition product into the desired polymerized product, with regeneration of the catalyst salt in solid condition. The polymer or polymers so formed may be separated in liquid form, or may be withdrawn in vapor form and then condensed.

As a specific example of the present invention, one may employ a catalyst consisting substantially of sodium bisulphate in divided condition, but containing also a small percentage of water, say about 3%, more or less, by weight of the catalyst. Gaseous isobutylene and this catalyst may be brought into contact at a pressure above normal atmospheric pressure, say at a pressure between 5 and 100 atmospheres, and at a temperature above atmospheric temperature and below the melting point of the catalyst, and preferably between about 100° C. and the melting point of the catalyst, for example, about 140° C. to 180° C. Since the critical temperature of isobutylene is in the neighborhood of 127° C. it will necessarily be present in the gaseous state at the start of the reaction when temperatures higher than this are used. At temperatures below the critical temperature, the pressure should be such as to maintain the isobutylene in the gaseous state, as noted above. This procedure causes the formation of polymerized products of isobutylene which are liquids at ordinary temperatures, and which consist largely of di-isobutylene. The liquid product thus obtained is useful as a superior motor fuel of high anti-knock properties.

Inasmuch as sodium bisulphate, $NaHSO_4$, is hygroscopic, it will frequently be found that the act of grinding, or otherwise dividing, and classifying or handling this substance in the open air, preparatory to use thereof as a catalyst in the practice of my invention as described above, will cause the absorption of enough water to enable the polymerization to take place, without the necessity of adding additional water to the solid catalyst.

As a second specific example of my invention, one may proceed as in the preceding example, but employ a catalyst consisting substantially of potassium bisulphate in divided condition, together with a small percentage of water, say about 3%, more or less, by weight of the catalyst. Since the melting point of potassium bisulphate is higher than that of sodium bisulphate, somewhat higher temperatures may be used in this case, if desired.

I claim:

1. The method of polymerizing mono-olefins which comprises subjecting a mono-olefin in gaseous state to contact with a catalyst comprising a bisulphate of an alkali metal in solid form, at a temperature between about 100° C. and the melting point of said bisulphate, and in the presence of water vapor in sufficiently small proportion to substantially avoid the presence of free water in liquid state at said temperature.

2. The method of polymerizing mono-olefins which comprises subjecting a mono-olefin in gaseous state to contact with a bisulphate of an alkali metal in solid form, at a temperature between about 100° C. and 180° C., and in the presence of water vapor in sufficiently small proportion to substantially avoid the presence of free water in liquid state at said temperature.

3. The method of polymerizing mono-olefins which comprises subjecting a mono-olefin in gaseous state to contact with a catalyst comprising an acid sulphate of aluminum in solid form, at a temperature between about 100° C. and the melting point of said acid sulphate, and in the presence of water vapor in sufficiently small proportion to substantially avoid the presence of free water in liquid state at said temperature.

HENRY J. WELGE.